United States Patent [19]

Hadler

[11] 4,000,805
[45] Jan. 4, 1977

[54] SAFETY STOP FOR PORTABLE AUGERS AND LIKE ELEVATING MACHINERY

[75] Inventor: Howard Hadler, Kewanee, Ill.

[73] Assignee: Chromalloy American Corporation, St. Louis, Mo.

[22] Filed: June 6, 1975

[21] Appl. No.: 584,505

[52] U.S. Cl. .............................................. 198/320
[51] Int. Cl.$^2$ ........................................ B65G 41/00
[58] Field of Search ............... 403/112, 330; 198/7, 198/11, 12, 13, 118, 126, 233

[56] References Cited

FOREIGN PATENTS OR APPLICATIONS

| 491,073 | 3/1953 | Canada | 198/233 |
| 1,018,520 | 1/1953 | France | 198/233 |

*Primary Examiner*—Johnny D. Cherry
*Assistant Examiner*—Douglas D. Watts
*Attorney, Agent, or Firm*—Johnson, Dienner, Emrich & Wagner

[57] ABSTRACT

A portable farm type elevating auger is disclosed supported on a truck having lower hinged frames one of which is connected to adjacent the feed end of the auger and the other to a roller carriage which moves along a track longitudinally of the auger underside as a cable connected between the two frames is wound or unwound from the drum of an operating winch to change the hinge angle between the frames and thereby the inclination of the auger. Pivotally mounted on the carriage is a spring biased latch to which the cable is attached. The spring is biased to rotate the latch when the tension of the cable thereon is removed as by the cable or a sheave breaking so that the latch engages the next track hanger as the auger starts to fall and thereby prevents its total collapse.

11 Claims, 5 Drawing Figures

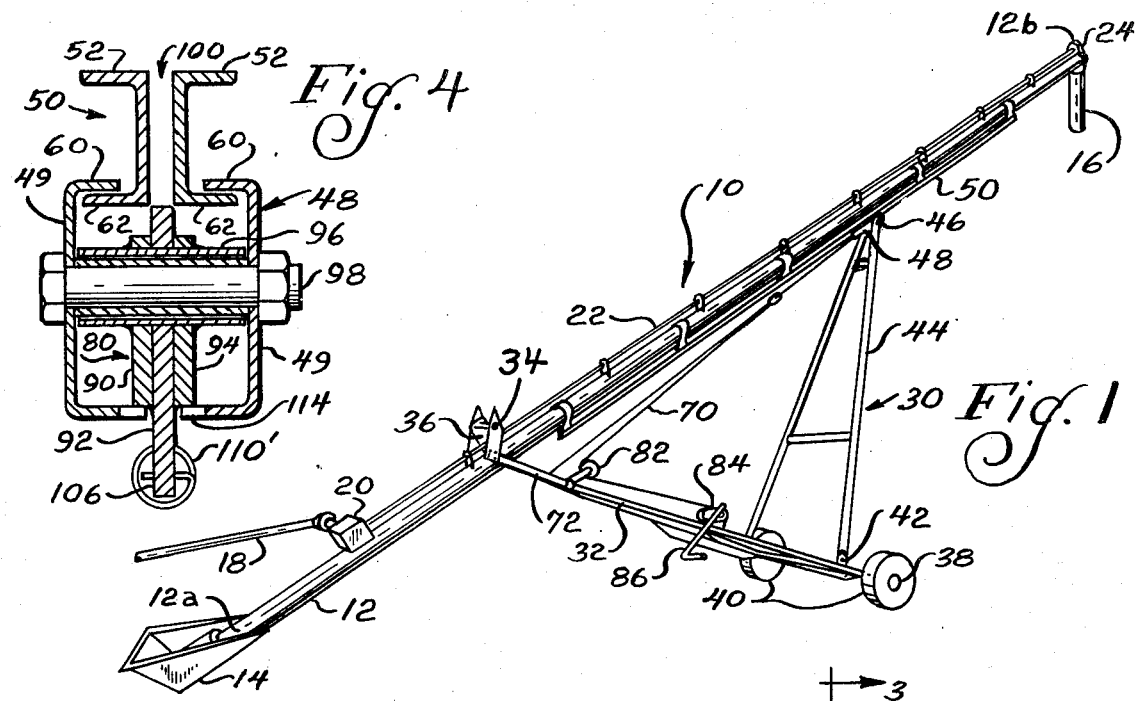
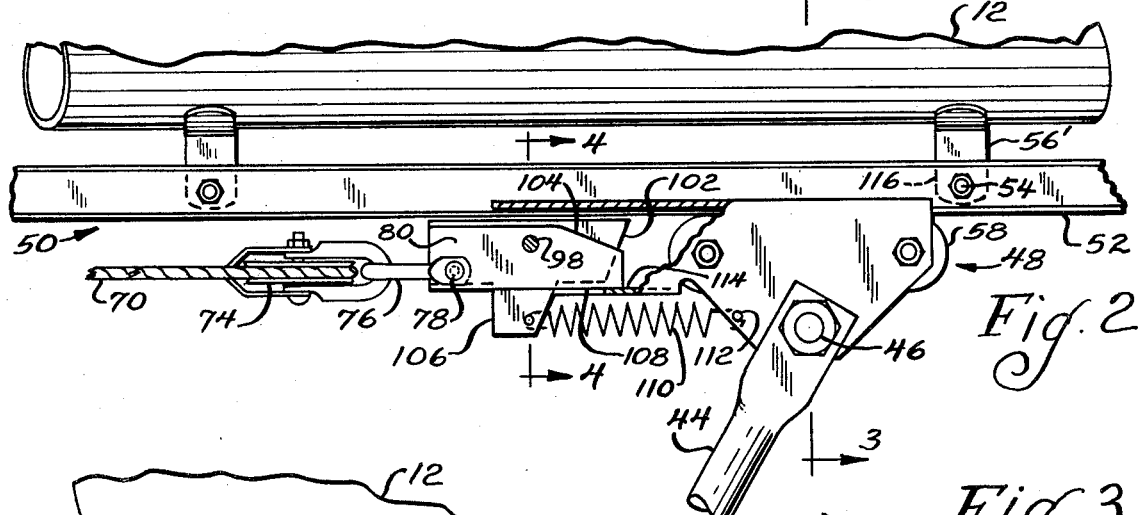
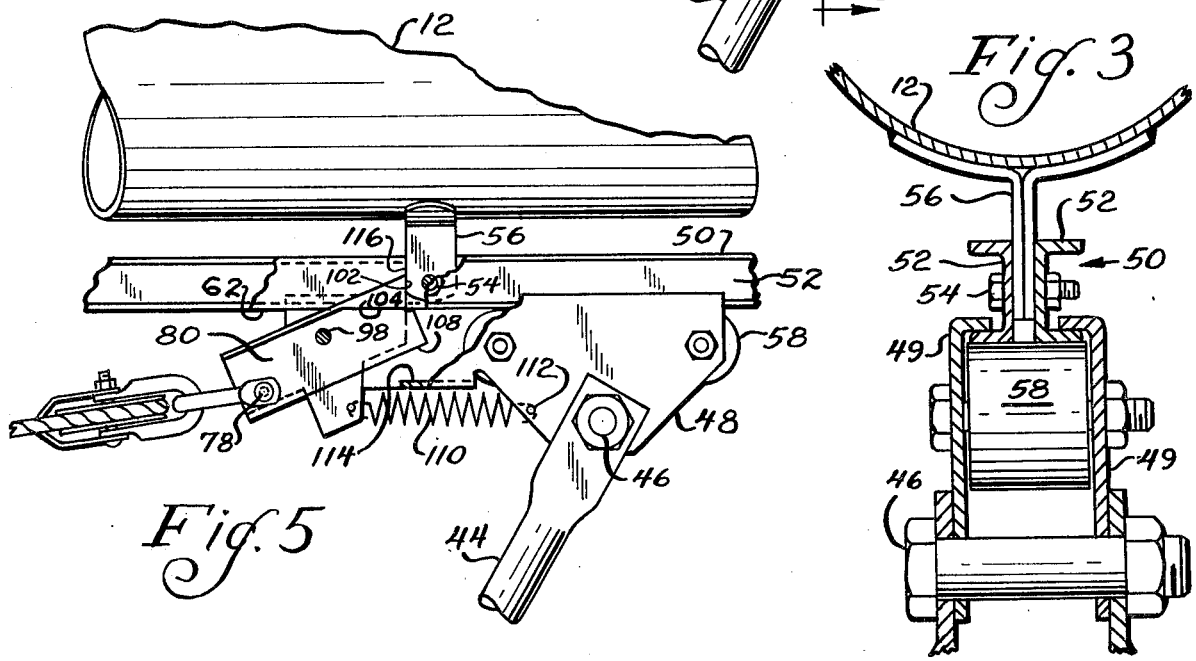

SAFETY STOP FOR PORTABLE AUGERS AND LIKE ELEVATING MACHINERY

This invention relates to crop handling machinery and particularly to farm type portable augers and elevators such as are used to top load grain storage structures and the like found on a farm, including barns, silos, bins, cribs and the like, or to simply stock pile material in an open area or field.

The troughs or sleeves of such machinery are necessarily long in comparison to their cross section and when used are often inclined at sharp angles in the order of 25° to 45° in order that their discharge ends can reach a needed height. For example, augers of 6 inches and 8 inches diameters having a length in excess of 60 feet are customarily set at an angle of 45° to reach a discharge height sufficient to top load a 40 foot silo. If the silo is higher or a shorter length auger is being utilized, then the angle of inclination must be greater. At the same time, it is also highly desirable that such machinery be lowerable to a horizontal disposition which will allow the long trough or sleeve to be pulled behind a tractor or other vehicle while in a safe, stable position.

For these purposes such machinery are commonly supported intermediate their feed and discharge ends on a wheel bearing truck which is so adapted that the auger sleeve or elevator trough can be raised and lowered between a horizontal transport position and a maximum inclination of perhaps 45°.

Typically such a truck will comprise an A-shaped push frame to the lower wider end of which the wheels are mounted, the narrow upper end of the push frame being hinged to a suitable anchor fastened to the elevator trough or auger sleeve near its feed end. Hinged to said push frame immediately above the wheel mounts is a second frame, usually referred to as a raising frame and which may also be A-shaped. The narrower upper end of the raising frame is hinged to a roller carriage which rides the underside of the sleeve or trough itself and more usually in a provided channel or track extending lengthwise thereof from short of the hinged upper end of the push frame to adjacent the discharge end of the sleeve or trough. A cable fastened and/or passing over sheaves connected to the push and raising frames and tensioned on the winding drum of an operating winch or the like is relied upon to hold the two frames in an adjusted angular relation under the weight of the machinery. The angle between the frames may be decreased by winding more cable onto the drum or increased by paying out cable therefrom. The mechanism has been found to work well to raise and lower the auger sleeve to a required inclination and/or horizontal disposition. However, there is a potential hazard premised on the failure of cable tension; and it has been found that breaking or frayed cables, sheaves and other hardware associated with the cable have been involved in a large percentage of auger accidents.

It is therefore a principal object of the present invention to eliminate the aforementioned potential problem or drawback inherent in the use or operation of previously available farm type portable material handling machinery such as elevating augers and conveyors.

An object of the invention companion thereto is to provide a safety stop mechanism for such portable farm type machinery which is automatically brought into play in response to cable failure or removal of cable tension to prevent uncontrolled downward fall or collapse of the machinery and its raising frame, particularly when the machinery is in its inclined operating position.

Another object of the invention is to provide a safety mechanism of the aforenoted character which is simple in construction and reliable in operation.

A still further object is to provide such a mechanism which is uniquely arranged in combination with the operating mechanism for raising and/or lowering the sleeve or trough of the elevating machinery.

In the accomplishment of the aforesaid objects of the invention, abutments are spaced at intervals to one side of the track along which the roller carriage moves and the carriage has a latch pivoted thereto and a spring which acts on the toggle to rotate it to said side of the track should the cable break or its tension on the raising frame be otherwise removed. In accordance with the invention the pull or tension of the cable normally acts on the latch so that it is not rotated by the spring and the latch stays within the limits of the roller carriage. However, in the event the cable tension is removed then the latent force of the spring acts to rotate the latch into a position where it engages the next abutment and halts further lowering of the elevating machinery sleeve or trough.

In a preferred form of the invention said abutments comprise the hangers by which the roller carriage track of a portable elevating auger is suspended from the underside of the auger sleeve.

It is a feature of the invention that the force of the cable which acts on the toggle to counter the rotating force of the spring on the latch is transmitted through the toggle primarily to the roller carriage rather than to the spring. In accordance with the invention this occurs because the force of the cable is exerted off center from both the spring and the pivot of the latch causing a counter rotation force on the latch which urges a first stop thereon to engage a first abutment on the carriage. However, the angle of said rotation need be small and only sufficient to load the spring. An advantage of the arrangement is that only a light weight spring is required.

A further feature of the invention is that the latch is so shaped as to have a limiting portion which engages either the track itself or a stop on the carriage when it is rotated by the spring so that the reactive force of the abutment when engaged by the toggle end again is transmitted to the roller carriage rather than against the spring.

The above, as well as other objects, advantages and features of the invention will be readily apparent upon consideration of the description of the preferred embodiment of the invention which now will be described.

Referring therefore to the several views of the accompanying drawings wherein like reference numerals indicate like structure throughout said views:

FIG. 1 is a perspective view of a portable elevating auger in which the invention is embodied;

FIG. 2 is a fragmented side elevational view on a larger scale of a portion of the auger shown in FIG. 1 and illustrates the safety stop mechanism in the normally operating condition of the auger;

FIG. 3 is a cross sectional view taken along lines 3—3 of FIG. 2 looking in the direction indicated by the arrows;

FIG. 4 is a sectional view taken along lines 4—4 of said FIG. 2; and

FIG. 5 is a view generally similar to FIG. 2 and shows the safety stop mechanism actuated to engage a track hanger on the auger sleeve and halt fall or collapse of the auger.

Referring now more particularly to FIG. 1, a portable auger of the farm type used to top load a silo with grain or the like is indicated generally by 10. As illustrated, auger 10 comprises a sleeve 12 having a feed hopper 14 at its lower end 12a and a discharge spout 16 at its upper end 12b. Sleeve 12 contains spiral flighting (not shown) which is axially rotated to elevate grain deposited into hopper 14 to the upper end 12b of the sleeve where it discharges through spout 16. At 18 is a conventional tractor power take off. The rotational movement imparted thereto is transmitted through gear box 20 to rotate drive shaft 22 supported lengthwise of the auger sleeve in suitable bearing supports. Drive shaft 22 in turn operates a chain drive 24 at the head of the auger sleeve to transmit its rotating movement to the aforementioned auger flighting within sleeve 12.

Auger sleeve 12 is illustrated supported in an inclined position on a truck or triangular support 30 comprising an A-shaped push frame 32 having its narrow upper end pivotally connected at 34 to an anchor 36 fixed about the auger sleeve 12 near the lower or feed end 12a thereof. The lower wide end of the push frame 32 supports axle means 38 to which are mounted a pair of wheels 40. Hinged to the push frame 32 immediately above its wheel mounts 38 as by pivot pins 42 is the lower wider end of an A-shaped raising frame 44.

Considering now FIGS. 2 and 3 with FIG. 1; the two arms of the push frame 44 are hingedly connected by pivot means 46 to a roller carriage 48 which slides along track 50. As illustrated best in FIG. 3, track 50 comprises a pair of channel bars or rails 52 fastened as by bolts 54 at spaced intervals to hanger straps 56 which are positioned therebetween to leave a clearance space 100 (FIG. 4) having a utility as afterwards explained. Hanger straps 56 partially encircle the underside of the auger sleeve to which they are suitably connected as by spot welding. As illustrated by FIG. 1, track 50 thus suspended by hangers 56 extends lengthwise of the underside of the auger sleeve from a point short of the pivotal connection 34 of the push frame 32 to a point short of the discharge auger end 12b. As shown in FIGS. 2 and 3, carriage 48 rotatably supports a pair of rollers 58 which ride the underside of the channel bars constituting track 50, the carriage having inwardly turned flanges 60 (FIG. 4) which lap the upper surface of the lower outwardly turned flanges 62 of said bolted channel bars 52 so that carriage 48 is captured by track 50 but moves freely and smoothly therealong. FIG. 1 illustrates that hinge pivots 34, 42 and 46 extend transversely of sleeve 12 and are parallel to each other such that the frames are free to hinge as roller carriage 48 moves along track 50 and are therefore useful to change the inclination of sleeve 12 and thereby to raise or lower the height of its discharge end 12b.

At 70 is a conventional winch cable which as shown in FIG. 1 is connected at one end 72 to the upper reaches of the push frame 32 as by clamps which fasten it to a cross brace (not shown) of said push frame. Cable 70 is also connected to the roller carriage 48 as by passing about a sheave 74 (FIG. 2) supported in a clevis 76 pinned at 78 to a latch 80 which is pivotally mounted on the roller carriage as afterwards more particularly described. Referring still to FIG. 1, cable 70, after passing about sheave 74, doubles back to the push frame 32 and passes about a second sheave 82 and then onto the drum 84 of a manually operated winch 86, both second sheave 82 and winch 86 being suitably anchored to the push frame. By cranking winch 86 in one direction cable may be payed out from its drum allowing raising frame 44 to move away from the push frame under the weight of the auger sleeve loaded thereon. When cranked in the opposite direction the cable is wound onto the drum to bring the frames closer together thus providing simple convenient means for changing the inclination of the auger sleeve and the height of its discharge end. It will be understood that winch 86 is of conventional construction and provided with the usual releasable lock such that in any adjusted position thereof the cable 70 remains in tension between the two hinged frames 32, 44 which are supporting the weight of the auger sleeve.

However, in accordance with this invention, the first sheave 74 as aforementioned is not directly fastened to the raising frame 44 as is conventional but instead to the carriage roller 48 through the intermediary of a latch 80 pivotally mounted thereto. Considering now FIGS. 2, 4 and 5, it will be seen that latch 80 comprises three plates 90, 92, 94, spot welded into an integral rigid unit. Extending through a provided opening in said unit and welded to said plates is a bearing sleeve 96 through which a pivot pin 98 extends and centers toggle 80 between the two roller carriage plates or halves 49 thereof such that the center plate 92 of the latch aligned with the above mentioned clearance space 100 created between the two channel bars 52 of the roller carriage mounting track 50 by the interposition of the hanger straps 56 therebetween.

Referring now to FIG. 2, it will be noted that the leading edge 102 of the center latch plate 92 recedes at a slight angle and that the forward upper corners of the two outer latch plates 90, 94 have been cut off at an angle to provide stop surfaces 104 beyond which the leading edge 102 of the latch protrudes. The center latch plate 92 also has a depending portion 106 below the under edge 108 of the outer plates to which one end of a spring 110 connects, the other end of which is shown connected to the roller carriage by a pin 112.

As shown in FIG. 2, in the normal operating condition of the auger, the under edges 108 of the two outer latch plates 90, 94 are at rest on an inturned flange 114 of the roller carriage plates 49. The pull of the cable 70 therefore is transmitted therethrough directly to the carriage roller 48 and does not affect spring 110, or only sufficiently that spring 110 is extended or slightly loaded. In the event the tension on cable 70 is removed the latent force of spring 110 thus stored becomes instantly available to rotate the latch in a counterclockwise direction about pivot pin 98 causing the protruding end 102 thereof to enter an adjacent clearance space 100 between the channel bars 52 of the roller carriage supporting track 50 until the inclined edges 104 of the outer latch plates 90, 94 come to rest against the underside of the lower flanges 62 of the channel bars 52 (FIG. 4). Said protruding end 102 is thereby located in position to engage its next hanger strap 56 at the end of the clearance space 100 as the auger sleeve falls. Said auger strap 56 thus becomes an effective stop or abutment 116 to halt further progression of the raising frame along track 50 and the impending fall and collapse of the auger is halted. Thus in normal operation of the auger, the spring biasing of the latch 80 serves no function; neither does it interfere with the lowering or raising of the auger. However, it remains as latent means to check the uncontrolled fall and collapse of the auger in the event that the tension on the cable 70 is accidentally or unintentionally removed as by fraying or snapping of the cable or by dislodgement or breakage of one of sheaves 74, 82 or their anchoring hardware.

Although the invention has been illustrated as applied to an elevating auger, as earlier explained, it will be immediately recognized that it also has utility and application as a safety stop mechanism to a wide variety of other crop handling machinery which employ a conveying sleeve, trough or like conveyor supported on a truck comprising hinged push and raising frames, the tilt angle of which is adjusted as by a variable length connecting cable which is tensioned under the weight of the supported sleeve or trough.

From the above description of a preferred embodiment, it will be appreciated that all of the recited objects, advantages and features of the invention have been obtained through the practical combination of structure efficiently and effectively arranged.

Having described the invention, I claim:

1. In portable crop and materials handling machinery, an inclinable conveyor having a feed end and a discharge end, a track along the underside of the conveyor between said feed and discharge ends having abutments and intervening spaces along the length thereof, a mobile triangular support for said inclinable conveyor having first and second relatively long frames hinged together adjacent their lower ends, the upper end of the first frame being connected to the inclinable conveyor near its feed end and the upper end of the second frame being connected to a carriage movable along said track between the conveyor discharge end and said connected end of the first frame to vary the separation of the upper ends of the two frames and thereby the altitude of the discharge end of the inclinable conveyor, cable means connected between the carriage and the upper end of the first frame, and a winch carried by one frame on which the cable means is wound and unwound against the resisting weight of the inclinable conveyor tending to separate the two frames so as to maintain pulling tension between the two frames and thereby maintain the altitude of the conveyor discharge end, said machinery including normally inactive latent means in combination therewith which upon failure or sudden loss of tension of the cable means between the frames is automatically activated to stop descent of the conveyor discharge end and total collapse of the conveyor, said latent means comprising a latch rotatably connected intermediate its ends to the carriage, the end of the latch toward the conveyor discharge end being movable on said rotatable connection into said intervening spaces between the abutments of the track, means on the latch to the opposite side of its rotatable connection to the carriage against which the pull of the cable means is continuously directed in the normal elevating and lowering of the conveyor to hold said latch end out of said intervening spaces of the track, and spring means on the carriage which bias said latch end in the direction of the track to locate said latch end within an adjacent one of the intervening spaces when the pull of the cable means on the latch is interrupted to engage the next abutment closer to the conveyor discharge end as the conveyor starts to fall whereby to halt further fall and total collapse of the conveyor.

2. The combination of claim 1 wherein the tension of the cable means exerted on the latch urges a stop on the latch against an abutment on the carriage means so that the tension of the cable means in excess of that required to load the spring means is transmitted to the carriage.

3. The combination of claim 1 wherein the latch includes limiting means which engage a provided stop on the conveyor under the bias of the spring when the cable tension on the latch is interrupted so as to positively locate the latch end within one of the intervening spaces for engagement by the next one of the abutments.

4. The combination of claim 1 wherein the latch has limiting means which engage a provided stop under the bias of the spring means such that the resisting force of the abutment when engaged by the spring means is transmitted to the carriage.

5. The combination of claim 1 wherein the track includes a slot extending lengthwise thereof with which the latch end is aligned to enter when biased by the spring means, said slot being interrupted by abutments one of which the end of the toggle engages when it enters the slot under bias of the spring means.

6. The combination of claim 5 wherein the carriage embodies a pair of plates supporting roller means on the track, the latch comprises a member pivotally mounted between said plates, and the spring is connected between a depending portion of the latch and said plates.

7. The combination of claim 6 wherein at least one of the plates has a portion constituting a stop against which a lower edge of the latch engages to transfer the force of the tensioned cable means on the latch to the carriage.

8. The combination of claim 7 wherein the latch has an inclined upper surface which engages the underside of the track when the spring biases the latch end into the track slot.

9. The combination of claim 8 wherein the latch end is so inclined that, when rotated within the track slot and its inclined upper surface engages the underside of the track, said latch end surface has full bearing engagement with the abutment.

10. The combination of claim 1 wherein the track comprises a pair of laterally spaced rails and the abutments comprise hangers fixed at intervals between said rails by which the track is secured to the underside of the conveyor.

11. The combination of claim 1 wherein the conveyor comprises a sleeve-enclosed auger and the upper end of the first frame is hingedly connected to the auger sleeve.

* * * * *

UNITED STATES PATENT OFFICE
CERTIFICATE OF CORRECTION

PATENT NO. : 4,000,805
DATED : January 4, 1977
INVENTOR(S) : Howard Hadler

It is certified that error appears in the above-identified patent and that said Letters Patent are hereby corrected as shown below:

Column 2, line 16, Change "toggle" to --latch--;

line 32, Change "toggle" to --latch--;

line 34, Change "toggle" to --latch--;

line 48, Change "toggle" to --latch--;

Column 4, line 31, Before "aligned" insert --is--.

Signed and Sealed this

Fifth Day of April 1977

[SEAL]

Attest:

RUTH C. MASON
*Attesting Officer*

C. MARSHALL DANN
*Commissioner of Patents and Trademarks*